Figure 1:
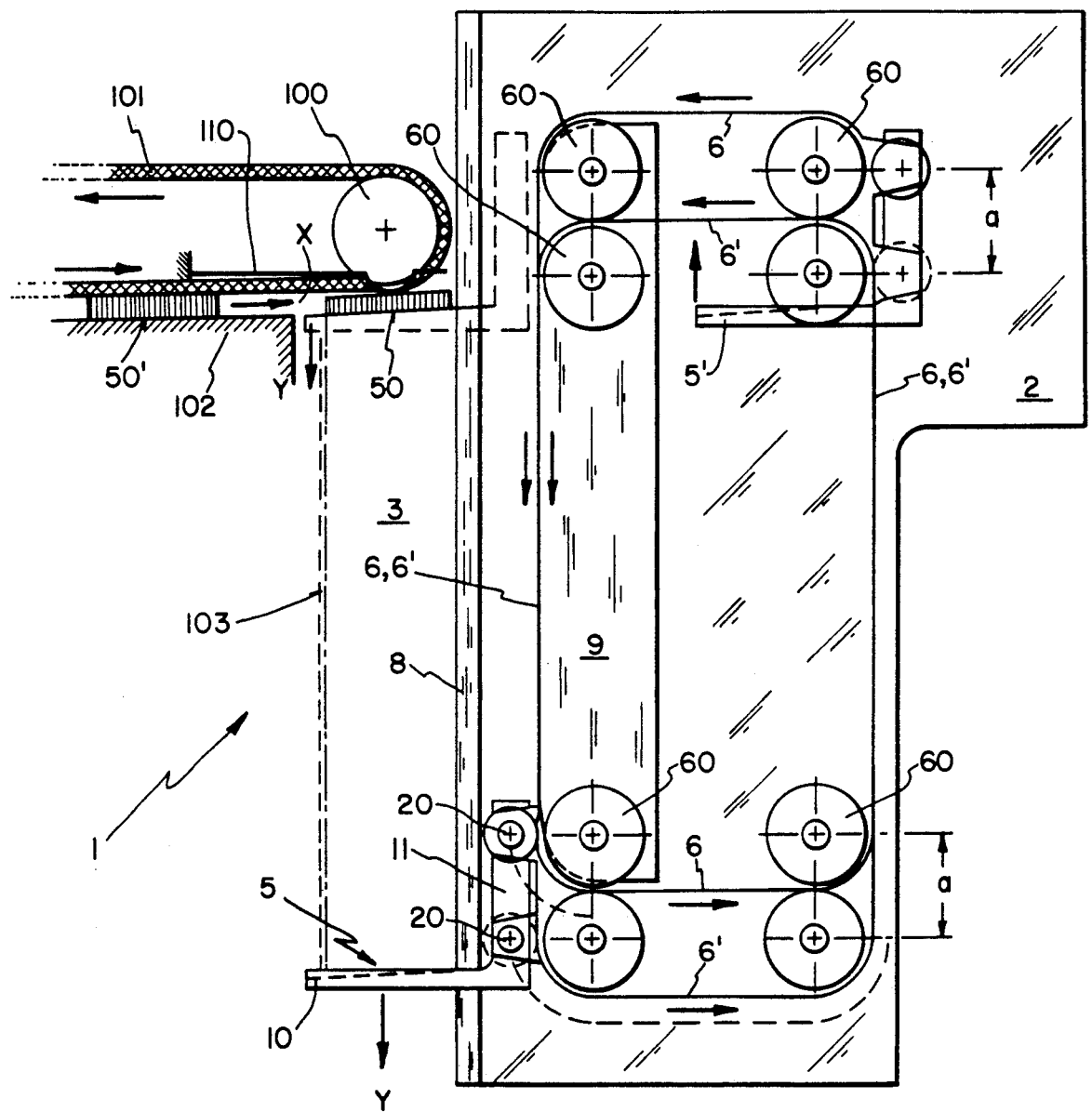

United States Patent [19]

Rapp

[11] Patent Number: 5,022,890
[45] Date of Patent: Jun. 11, 1991

[54] STACKING DEVICE FOR COINS OR SIMILAR DISK-SHAPED OBJECTS

[76] Inventor: Joachim Rapp, Bahnhofstr. 32, D-7504 Weingarten, Fed. Rep. of Germany

[21] Appl. No.: 398,158

[22] Filed: Aug. 24, 1989

[51] Int. Cl.$^5$ .............................................. G07D 9/06
[52] U.S. Cl. ........................................ 453/56; 453/61
[58] Field of Search ...................... 453/31, 56, 59, 61, 453/62; 53/212

[56] References Cited

U.S. PATENT DOCUMENTS

| | | | |
|---|---|---|---|
| 4,058,955 | 11/1977 | Nakai et al. ............................. | 53/212 |
| 4,220,169 | 9/1980 | Furuya ................................. | 453/31 X |

FOREIGN PATENT DOCUMENTS

| | | |
|---|---|---|
| 3239860 | 1/1988 | Fed. Rep. of Germany . |
| 2187176 | 9/1987 | United Kingdom . |

*Primary Examiner*—F. J. Bartuska
*Attorney, Agent, or Firm*—Jeffers, Hoffman & Niewyk

[57] ABSTRACT

A device for the vertical stacking of successively fed coins or similar disk-shaped articles, including a coin carrier connected to a continuously revolving conveyor belt and receiving the stack of coins while capable of being lowered in a stacking space of a coin packing machine in synchronism with the growing stack. The coin carriers are formed by an L-shaped finger whose first shank protrudes horizontally into the stacking space while its second shank is so connected with a pair of continuously revolving conveyor belts that the conveyor belts, based on the longitudinal axis of the second shank, attach on two mutually offset, lateral articulated axles. The continuously revolving conveyor belts run along trajectories which correspond to the spacing of the width of the second shank and are parallel to each other while in the vertical stacking direction they are mutually offset in accordance with the spacing of the lateral articulated axles. Obtained thereby is a coin stacking device where the coins are stacked on a single stacking finger, thereby eliminating the synchronization problems for two (and more) stacking fingers required according to the prior art.

10 Claims, 2 Drawing Sheets

STACKING DEVICE FOR COINS OR SIMILAR DISK-SHAPED OBJECTS

DESCRIPTION

The present invention concerns a device for the vertical stacking of successively fed coins or similar disk-shaped objects (subsumed under the term coins) according to the preamble of claim 1.

A device of this type is known from the German patent document No. 32 39 860. Here, the stack of coins is stacked on a pair of opposed coin carriers. These two coin carriers must be exactly synchronized by way of their continuously revolving belts, so that the coins injected into the stacking space will not lie skew or even stand on edge.

The problem underlying the present invention consists in proposing a coin stacking device of the categorial type where the stack of coins is stacked on only a single coin carrier.

This problem is solved by the means and measures set forth in the characterizing part of claim 1.

Advancements and special developments of this device are the object of the subclaims.

The inventional coin stacking device will be more fully explained hereafter with the aid of the drawing.

Figure 2:
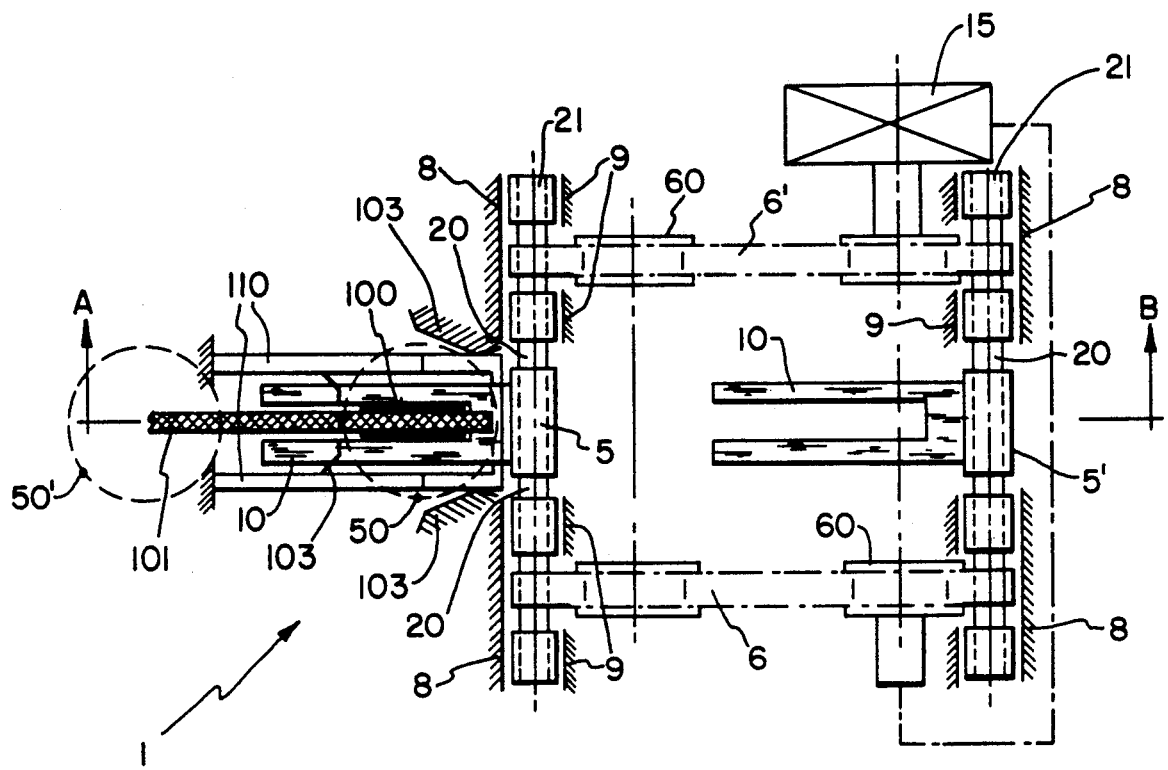
Figure 3:
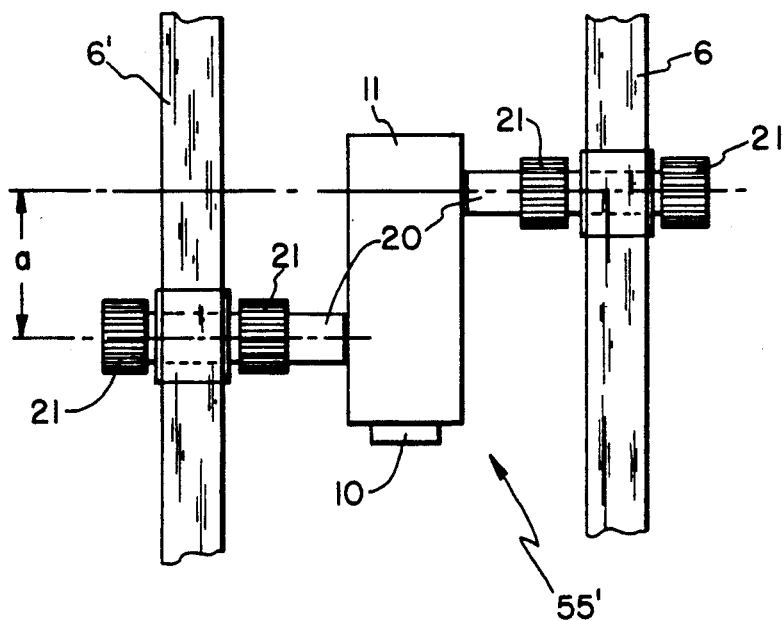

FIG. 1—a basic illustration—shows along section line A-B according to FIG. 2 a complete stacking device;

FIG. 2 a plan view of the coin stacking device according to claim 1;

FIG. 3 a detailed illustration of a coin carrier with articulated axles and guide rolls.

Illustrated in FIG. 1 is a coin stacking device 1 which as part of a coin packing machine continuously receives coins of a specific, presorted type. These coins are vertically stacked one upon the other and the stack of coins, once a specific stack height has been reached, i.e., after stacking of a predetermined number of coins, is wrapped and given or transported to a collection container.

The coin stacking device 1 according to FIG. 1 consists of two side parts 2 which through suitable constructional means are connected with each other so as to form a shaft type structure. This shaft type structure is sideways attached to an—only schematically indicated—coin singularizing and guide rail 102 by which the coins 50, 50' are transported and delivered (compare arrow X) piece by piece in the direction of the coin stacking device 1, by means of a conveyer belt 101 which continuously runs about a reversing roll 100. A stacking space 3 defined by the limiting elements 103 (indicated only schematically in FIG. 2) forms the connection or interface between the coin stacking device 1 and the coin conveyer belt 101 that feeds the coins 50, 50'. These limiting elements 103 always bound an annular space which is adjustable to the diameter of the coin type (50, 50') to be stacked; said annular space and the reversing roll 100 are preferably so balanced that the reversing roll 100 will be arranged coaxial to the stacking space 3.

This annular space, i.e., the stacking space 3, is bounded toward the coin stacking device 1 by a—not illustrated—stop plate, thus defining a vertical stacking shaft.

The coins are stacked along this stacking shaft, and at that, on a coin carrier 5 which with the aid of transport means is moved stepwise from top to bottom. In sort of a home position—compare the broken line illustration—this coin carrier 5 is located with its front edge on a level that is slightly below that of the said guide rail 102, so as to avoid from the outset a striking of the previously stacked coin. The coin carrier 5 is contained in the extension of the coin conveyer belt 101 of the coin singularizing and guide rail 102. Starting from this position, the coin carrier 5 is being lowered stepwise in accordance with the coin type fed and its thickness (arrow Y) until the preset number of coins has been stacked. This corresponds to the lower position of the coin carrier 5 depicted in FIG. 1; the stack of coins is then wrapped in this position or is passed on to a separate wrapping station.

The coin carrier 5 relieved from the stack of coins is by means of a continuously revolving transport facility returned again to its home position. To avoid idling in the stacking of coins, another coin carrier 5' is fixed on the transport means in a symmetric arrangement, based on the length or travel of the transport means. This additional coin carrier 5', in turn, is now moved in the home position opposite the coin conveyer belt 101 and loaded piece by piece with coins 50, 50'.

The coin stacking device 1 described so far is known from the prior art (compare German patent document No. 32 39 860), disregarding that the coins here are being stacked on two corresponding coin carriers that are on the same level.

The present invention relates to the design and guidance of the coin carriers 5, 5'. In terms of design, these coin carriers 5, 5' consist of an L-shaped finger whose first shank 10 protrudes horizontally into the stacking space 3 and serves as the actual stacking support. The second shank 11 is oriented parallel to the stacking direction or downward direction Y and is held in this orientation due to the connection or suspension on the transport means that will be described yet hereafter. According to a preferred embodiment, said first shank 10 of the L-shaped finger is of a conic design, and at that, in such a way that it slopes toward the free front edge. This provides an additional safety that the coins 50, 50' "shot," onto the coin carrier 5, 5' will not strike the front edge of the coin carrier 5, 5' and the stacked coins 50, 50'; lastly, also the successively stacked coins 50, 50' lie slanted in the stacking space 3.

Serving as transport means are two continuously revolving conveyer belts 6, 6' (or chain conveyers) which revolve each over 4 rectangularly arranged guide and reversing rolls 60 along a corresponding, essentially rectangular track. In the down direction Y, these tracks are mutually offset by a measure a. The belts 6, 6' revolve thus in two parallel planes. The second shank 11 of the L-shaped coin carrier 5, 5' is now coupled on its one side with the one conveyer belt (for instance 6) and on the other side with the second conveyer belt (for instance 6') by way of articulated axles 20 which, viewed in the longitudinal direction of the second shank 11, are mutually offset in accordance with the offset a of the track of the conveyer belts 6, 6'. As the conveyer belts 6, 6' revolve, the articulated axles 20 are thus held on a varying level corresponding to the measure a, so that the first shank 10 of the coin carrier 5 will always revolve horizontally. Based on the pictorial illustration, this means that two tracks of the conveyer belt 6, 6' extend perpendicularly to the drawing plane, with the upper track—relative to the stacking direction Y—for the conveyer belt 6 being the track for the articulated axle 20 that is adjacent to the free end of the second shank 11; the second conveyer belt 6' defines the orientation of the articulated axle 20 adjoining the first shank 10. Thus, the coin carrier 5, 5' is run horizontally into the stacking shaft and is moved downward (arrow Y) stepwise in accordance with the stacking speed. Upon reaching the reversal point, the coin carrier 5, 5' is moved out horizontally, whereby the stack of coins, e.g., can simply be stripped.

Viewed kinematically, both coin carriers 5, 5' are exactly balanced on one another so that simultaneously with the released (finished) stack of coins stacked in the stacking space 3 on the quasi bottom reversal point of the one coin carrier (for instance 5) the second coin carrier (for instance 5') enters the stacking home position (indicated by broken line, as already mentioned) so as to receive the first coin of a coin stack.

To increase the functional reliability of the coin stacking device as a unit, the coin carrier 5, 5'—as already mentioned—is so designed that its free front end slopes slightly and the coins 50, 50' of a coin stack lie with a slant toward the coin singularizing and guide rail 102. To support this slanted position and avoid from the outset that individual coins 50, 50' will possibly stand on edge and interfere with the function, an additional provision is to push down on the topmost coin 50 with a hold-down element, for instance a spring 110. This ensures that successively fed coins 50' can be smoothly placed—the preceding coin 50 lies lower with its rear edge and is retained in this position by the spring 110.

To assure, moreover, that the coin carrier 5, 5' will receive stable guidance during the stacking process itself, the coin carrier 5, 5' is under forced guidance along its front trajectory—based on the drawing. To that end, guide rolls (21 in FIGS. 2, 3) that are coaxially aligned on the articulated axles 20 on the second shank 11 of the coin carrier 5, 5' and protrude sideways are provided, running between a front guide shield 8 and a rear guide shield 9. Thus, the offset a between the guide rolls 21 provides a rigid guidance for the coin carriers 5, 5'.

FIG. 2 shows a plan view of the coin stacking device 1 according to FIG. 1. The one coin carrier 5—which is active during the following stacking phase—protrudes with its first shank 10, serving as a stacking table, into the stacking space 3 or stacking shaft and moves downward perpendicularly to the drawing plane. In the process, the coin carrier 5 receives piece by piece the coins 50, 50' fed by means of the conveyer belt 101 and moves them in synchronism, step by step, in a vertical direction relative to the drawing plane. The second coin carrier 5' is located on the back side of the coin stacking device 1 and moves in synchronism with the coin carrier 5 in vertical direction out of the drawing plane. Both coin carriers 5, 5' are coupled by means of the continuous conveyer belts 6, 6' which, in turn, run around the reversing rolls 60. These conveyer belts 6, 6' run parallel to each other; based on the drawing plane, however, their visible trajectory sections are on different levels (compare illustration in FIG. 1).

The drive is indicated only in simplified fashion, and at that, by a motor 15 driving one reversing roll each of the two conveyer belts 6, 6', and at that, in strict synchronism. The conveyer belts 6, 6' are coupled with the coin carriers 5, 5' by way of the articulated axles 20. Provided in the extension of these jointed axles 20 are the guide rolls 21, which on the front side of the coin stacking device 1 are under forced guidance between the front and rear guide shields 8 and 9.

Visible in the illustration according to FIG. 2, specifically, is the spring 110 that acts as a hold-down element on always the topmost coin 50. This spring consists of a split leaf spring which on both sides of the reversing roll 100 pushes down sideways on the coins 50. Basically, the two shanks of the slotted leaf spring can separately push down on the coins; however—as illustrated in the drawing—it is also possible to connect the free front ends of the slotted leaf spring with each other or leave them connected.

FIG. 3 shows a coin carrier 5, 5' as a separate illustration. It is fashioned as an L-shaped finger whose first shank 10 protrudes perpendicularly out of the drawing plane while its second shank 11 extends parallel to the drawing plane. Provided on this second shank 11, sideways, is a jointed axle 20 and a coaxial guide roll 21, and at that, spaced relative to each other a distance (offset) a. The jointed axles 20 are connected with the schematically illustrated conveyer belts 6, 6' which, finally, permit the coin carriers 5, 5' to revolve along the rectangular trajectory with an always horizontally aligned stacking plate.

Naturally, it is also possible to support the articulated axles 20 connected with the conveyer belts 6, 6' on both sides by means of guide rolls. The coin carrier 5, 5' is thus supported on both ends in two points.

To give the coin stacking device 1 a very compact design, the contours of the coin carriers 5, 5' may be so fashioned in their area concerning the second shank 11 that the coin carrier running upward engages with its first shank 20 at least partly the area of the second shank 11 of the coin carrier 5 running downward. As a preferred advancement of the coin carrier 5, 5', the first shanks 10—as illustrated in FIG. 2—are slotted. This makes it possible—which may be necessary in view of small coins—to adjust the spacing between the coin singularizing and guide rail 102 and the reversing roll 100 with the coin conveyer belt 101, for one, and the coin stacking device 1 with the coin carrier 5, 5', for another, very close, facultatively overlapping.

I claim:

1. Device for the vertical stacking of successively fed coins or similar disk-shaped articles with a coin carrier that is connected with a continuously revolving transport means, receives the stack of coins and which in a stacking space of a coin packing machine can be lowered in synchronism with the growing stack, and with another coin carrier which, based on the transport means, is arranged at an equal distance from the other coin carrier so that with each revolution of the transport means it is possible to build two stacks of coins, characterized in that the coin carriers are formed by an L-shaped finger whose first shank protrudes horizontally into the stacking space and whose second shank is connected with a pair of continuously revolving transport means in such a way that these, based on the longitudinal axis of the second shank, attach to two sideways articulated axles that are offset relative to each other, in that the continuously revolving transport means revolve along essentially rectangular trajectories that correspond to the spacing of the width of the second shank and are parallel to each other while in vertical stacking direction they are mutually offset according to the spacing of the sideways articulated axles, and in that the second shank runs in such a way along the stacking space that the first shank is being lowered down the stacking space in positionally stable fashion as the coins are being stacked.

2. Device according to claim 1, characterized in that guide rolls protruding, sideways, coaxially to the articulated axles are provided, and in that along the stacking space there is provided a front guide shield and, spaced by the diameter of the guide rolls, a rear guide shield for receiving and stabilization of the guide rolls.

3. Device according to claim 1, characterized in that the first shank of the L-shaped finger is of a conic design, and at that, in such a way that the upper surface slopes toward the free front edge.

4. Device according to claim 1, characterized in that in the plane of the stacking space corresponding to the topmost coin of a stack there is a hold-down element provided which forces each newly fed coin onto the stack of coins.

5. Device according to claim 4, characterized in that the hold-down element is fashioned as a slotted leaf spring which by point contact pushes down on the stacked coins or coins to be stacked.

6. Device according to claim 5, characterized in that the slotted leaf spring is closed on the free front edges.

7. Device according to claim 1, characterized in that the first shank of the L-shaped finger is slotted.

8. Device according to claim 2, characterized in that the first shank of the L-shaped finger is of a conic design, and at that, in such a way that the upper surface slopes toward the free front edge.

9. Device according to claim 2, characterized in that in the plane of the stacking space corresponding to the topmost coin of a stack there is a hold-down element provided which forces each newly fed coin onto the stack of coins.

10. Device according to claim 3, characterized in that the first shank of the L-shaped finger is slotted.

* * * * *